United States Patent
Ahmed

(10) Patent No.: US 7,929,694 B2
(45) Date of Patent: Apr. 19, 2011

(54) VARIABLE LENGTH PRIVATE KEY GENERATOR AND METHOD THEREOF

(75) Inventor: Nabeel Ahmed, Bangalore (IN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 992 days.

(21) Appl. No.: 11/806,334

(22) Filed: May 31, 2007

(65) Prior Publication Data

US 2008/0298584 A1  Dec. 4, 2008

(51) Int. Cl.
*H04L 9/00* (2006.01)
*H04B 10/00* (2006.01)
*H04L 9/20* (2006.01)
*H04L 9/14* (2006.01)
*H04L 9/08* (2006.01)

(52) U.S. Cl. ............... 380/46; 380/42; 380/47; 380/277; 398/167.5

(58) Field of Classification Search ............ 380/46; 359/167
See application file for complete search history.

(56) References Cited

U.S. PATENT DOCUMENTS
5,297,207 A * 3/1994 Degele ......................... 380/46
2003/0072059 A1 * 4/2003 Thomas et al. ............... 359/167

FOREIGN PATENT DOCUMENTS
EP        1223707 A1 *   7/2002

OTHER PUBLICATIONS

Speidel, Ulrich; Gulliver, T. Aaron; "A secure authentication system based on variable-length codes", Information Theory and its Applications (ISITA), 2010 International Symposium on Digital Object Identifier: 10.1109/ISITA.2010.5649672, Publication Year: Oct. 2010, pp. 684-689.*

* cited by examiner

*Primary Examiner* — Matthew B Smithers
*Assistant Examiner* — Courtney D Fields
(74) *Attorney, Agent, or Firm* — Harness, Dickey & Pierce

(57) ABSTRACT

The present invention relates to a variable length private key generator. According to one embodiment, the variable length private key generator includes a permuter. The permuter is configured to generate a key stream of a desired length by permuting a plurality of shift registers. The permuter includes the plurality of shift registers, a plurality of clocking modules, and/or an output module. Each clocking module corresponds to a different one of the plurality of shift registers and is configured to generate a clocking signal based on selected bits of the corresponding shift register. The output module is configured to output the key stream based on at least one clocking signal and output of at least one of the plurality of shift registers.

25 Claims, 3 Drawing Sheets

VARIABLE LENGTH PRIVATE KEY GENERATOR AND METHOD THEREOF

BACKGROUND OF THE INVENTION

Data encryption systems often use secret keys (or private keys) to securely exchange information. The secret keys are used to convert original information (plaintext) to encrypted information (cipher text), and vice versa. By encrypting information using a secret key such that only someone else with knowledge of the secret key will be able to decipher it, the possibility that eavesdroppers might learn the contents of encrypted messages is significantly reduced.

Conventional cryptography depends on the computational complexity of mathematical algorithms to generate the secret keys. Encrypted information is broken up into cipher blocks, for example, of a given length, where each block is encrypted or decrypted using a secret key of the same given length. As such, conventional cryptography key generation is usually application specific and implemented to generate secret keys of a given length.

SUMMARY

The present invention relates to a variable length private key generator. According to one embodiment, the variable length private key generator includes a permuter. The permuter is configured to generate a key stream of a desired length by permuting a plurality of shift registers. The permuter includes the plurality of shift registers, a plurality of clocking modules, and/or an output module. Each clocking module corresponds to a different one of the plurality of shift registers and is configured to generate a clocking signal based on selected bits of the corresponding shift register. The output module is configured to output the key stream based on at least one clocking signal and output of at least one of the plurality of shift registers.

The present invention also relates to a method of generating a variable length private key. According to one embodiment, the method includes permuting a plurality of shift registers to generate a key stream of a desired length. Permuting the plurality of shift registers includes generating clocking signals based on bits tapped from the plurality of shift registers according to tap sequences derived from primitive polynomials. The clocking signals are used to permute at least one of the plurality of shift registers.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

DESCRIPTION OF EXAMPLE EMBODIMENTS

Figure 1:
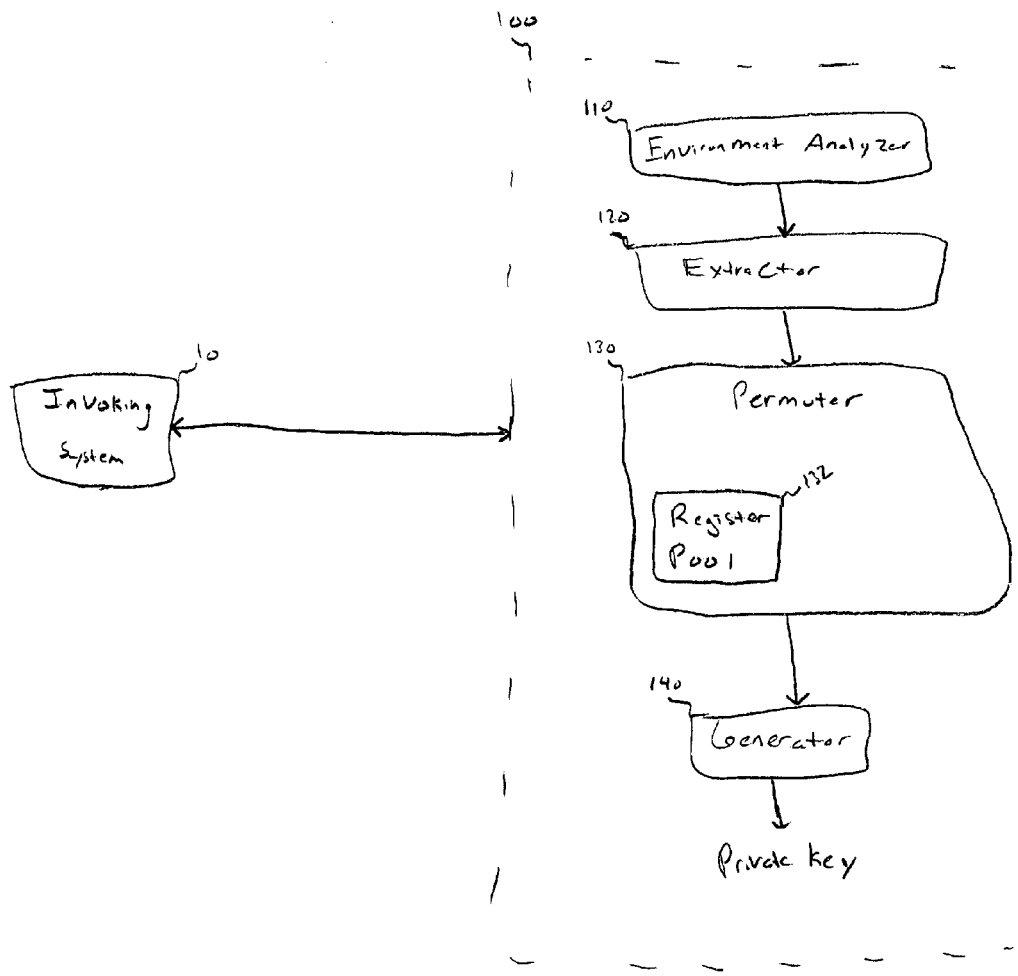
FIG. 1 is a block diagram illustrating a variable length private key generator according to an example embodiment of the present invention.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram illustrating a variable length, private key generator according to an example embodiment of the present invention. As shown, the key generator 100 includes an environment analyzer 110, an extractor 120, a permuter 130, and/or a generator 140. The permuter 130 includes a register pool 132. The key generator 100 is invoked by an invoking system 10, which may be an internal or external system, to generate a private key of a variable length, where the desired length is specified by the invoking system 10. For example, the invoking system 10 may be a computer or other processor-based unit, such as servers, desktop computers, electronic devices including music and/or video players, digital still and/or video cameras, wireless units including mobile phones, wireless PDA's, wireless devices with highspeed data transfer capabilities, such as those compliant with "3-G" or "4-G" standards, "WiFi"-equipped computers, or the like.

According to an example embodiment, the key generator 100 uses certain dynamic system parameters of the invoking system 10 to generate a private key of the desired length. The environment analyzer 110 analyses the operating system, memory system, buffer memory, and other information of the invoking system 10. The environment analyzer 110 also analyses the invoking system 10 to determine which system parameters are available for use by the key generator 100. The system parameters surveyed by the environment analyzer 110 may include the number of processes running in the invoking system 10, certain process and group identifiers, current central processing unit (CPU) utilization information, timer information, random access memory (RAM) and buffer utilization information, peripheral device usage information, and/or etc.

For example, if the invoking system 10 is a telecommunications server running on a Linux/Unix/Solaris platform using secure tokens to communicate to a network gateway or an external network, the environment analyzer 110 may use the "prstat -s cpu 1" command to retrieve dynamic system parameters, for example, CPU and memory usage of system processes, process IDs (PIDs), load averages, and the like, from the invoking system 10.

Because the system parameters are dynamic (i.e. constantly changing), data extracted from the system parameters of the invoking system 10 will consist of essentially random numbers. The environment analyzer 110 determines which system parameters (and in which combination) will result in a robust key being generated, and sends this information to the extractor 120.

Following the previous example for an invoking system 10 of a telecommunications server running on a Linux/Unix/Solaris platform, the environment analyzer 110 may use the "prstat -s cpu 1" command to retrieve a first PID, a second PID, a Memory Size of the first process, a CPU usage of the first process, and a CPU Time of the second process, for example. If the desired length of the private key to be generated is significantly larger than the number of bits in the system parameters, the environment analyzer 110 signals the extractor 120 to use one or several of the system parameters (for example, the first PID) multiple times.

The environment analyzer 110 further instructs the extractor 120 to extract data from the system parameters in a specific order (i.e., to avoid periodic repetition). For example, the environment analyzer 110 may instruct the extractor 120 to extract data from the first PID, then from the CPU Time for the second process, then from the first PID again, then from the second PID, and then from the Memory Size of the first process.

The extractor 120 determines if the available resources of the invoking system 10 are sufficient to generate a key of the desired length. For example, the extractor 120 may look at buffer memory, or available flash memory, of the invoking system 10, and determine if the available memory is sufficient to accommodate a key of the desired length. If the extractor 120 determines that resources of the invoking system 10 are not sufficient, the key generation process is aborted. Otherwise, the extractor 120 will extract data from the system parameters as identified by the environment analyzer 110.

Figure 2:
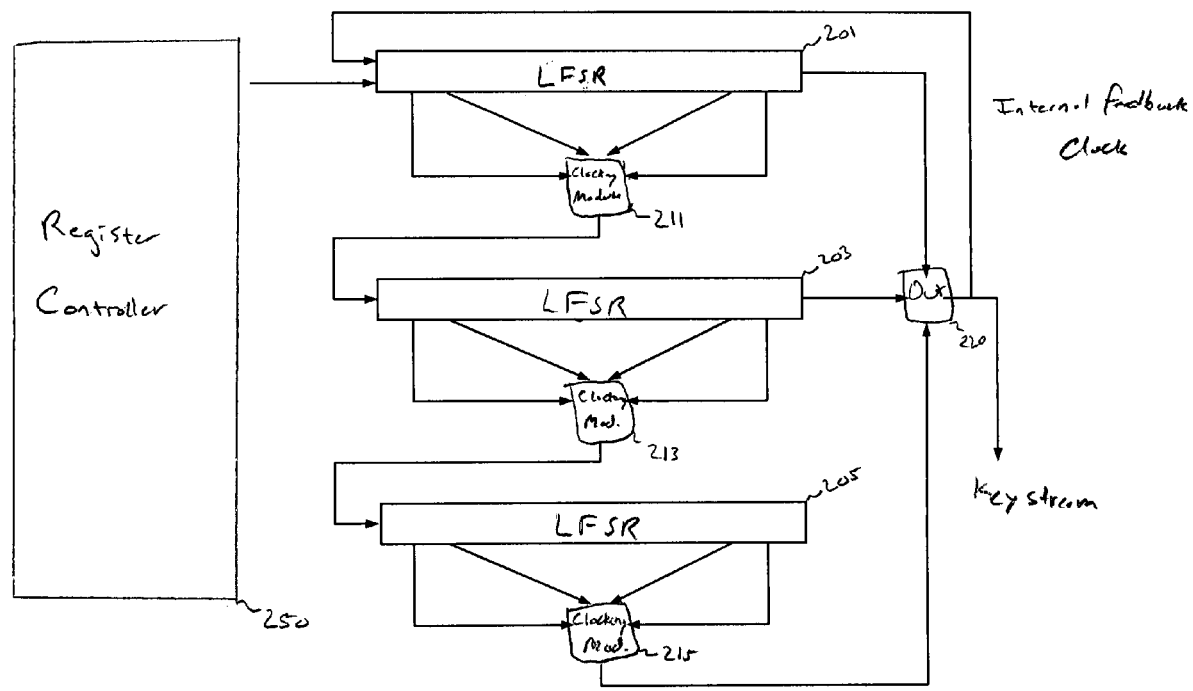
FIG. 2 is a schematic illustrating in more detail the register pool 132 of the permuter 130 of FIG. 1, according to an example embodiment of the present invention.

The permuter 130 manipulates the extracted data to generate an essentially random private key. FIG. 2 is a schematic diagram illustrating the permuter 130 of FIG. 1 in more detail, according to an example embodiment of the present invention.

As shown, the permuter 130 includes a register pool 132. The register pool 132 includes first, second, and third linear feedback shift registers (LFSR) 201-205 connected to a series of corresponding clocking modules 211-215, a register controller 250 connected to each LFSR 201-205, and an output module 220. The output module 220 uses outputs of the LFSRs 201-205 and/or clocking modules 211-215 to generate a key stream. An LFSR is a shift register whose input bit is a linear function of its previous state.

Referring to FIG. 2, one or several bits of LFSR 201 are fed into clocking module 211, and the output of clocking module 211 is connected to LFSR 203. Similarly, one or several bits of LFSR 203 are fed into clocking module 213, and the output of clocking module 213 is connected to LFSR 205. One or several bits of LFSR 201 are fed into clocking module 211. The output of clocking module 211, the output of LFSR 201, and the output of LFSR 203 are fed into output module 220. The output of output module 220 is the key stream, and may also be connected to LFSR 201.

Although three LFSRs 201-205 and corresponding clocking modules 211-215 are shown in FIG. 2, the total number of registers and clocking modules may be scaled to any number without deviating from the intended scope of the present invention.

The length of each LFSR 201-205 is set dynamically by the register controller 250 according to the desired key length specified by an invoking system. Each of the three LFSRs 201-205 is set to a primitive length (i.e., a prime number) such that the total number of bits in the register pool is equal to the total number of bits of a key with the desired length, unless the desired length necessitates one or several of the registers be set to the next largest prime. For example, with reference to FIG. 2, if the desired key length is 128 bits, the register controller 250 sets LFSR 201 to 43 bits, LFSR 203 to 43 bits, and LFSR 205 to the next largest prime length greater than the remaining 42 bits (i.e., 43 bits).

The initial state of each LFSR 201-205 is set by the register controller 250 using extracted data from an invoking system, initializing the values of each LFSR 201-205 in the register pool 132 with essentially random values. Following the previous example, once the length of each LFSR 201-205 is set, the register controller 250 puts the first 43 bits of extracted data from the extractor 120 into LFSR 201, the next 43 bits of extracted data into LFSR 203, and the remaining bits of extracted data into LFSR 205. If extra bits are needed to initialize the LFSRs 201-205, the register controller 250 may use a constant value (i.e., a '1' or a '0').

As shown in FIG. 2, certain bits (taps) of each LFSR 201-205 are fed into corresponding clocking modules 211-215. The taps are determined according to a given primitive polynomial generated by the register controller 250. Each primitive polynomial includes one or more non-zero terms corresponding to different positive powers of a given variable, and the powers of the non-zero terms determine which bits of a register correspond to the taps. The position of the taps, as determined by the given primitive polynomial, is referred to as a tap sequence.

For example, with reference to FIG. 2, assume the register controller 250 sets LFSR 201 to 11 bits and initializes those 11 bits to '01001101001' using extracted data from the extractor 120. Given the example primitive polynomial $x^{10}+x^3+1$, the register controller 250 sets the $10^{th}$, $3^{rd}$, and $0^{th}$ bits of LFSR 201 as the taps. Thus, the values of the $10^{th}$, $3^{rd}$, and $0^{th}$ bits of LFSR 201 are fed into clocking module 211.

The register controller 250 may generate primitive polynomials using standard algorithms which are well known in the art, or by referencing a lookup table of primitive polynomials for different degrees/orders. While the primitive polynomial used for each LFSR 201-205 may be of a degree less than the length of its corresponding register, this may decrease the period, and hence robustness, of the generated key stream.

Each LFSR 201-205 may use a different primitive polynomial (and tap sequence), although it may be desirable for a given primitive polynomial to be used by multiple registers, for example, to reduce the number of computations required. Furthermore, new primitive polynomials may be generated at each invocation of the key generator 100 by the register controller 250. The generation of new primitive polynomials not only accommodates registers used for different desired key lengths, but also increases the randomization of each generated key.

According to example embodiments of the present invention, registers in the register pool are clocked based on the state of other registers in the register pool. Referring to FIG. 2, LFSR 203 is clocked according to clocking module 211, whose output is dependent on the state of LFSR 201. Similarly, LFSR 205 is clocked according to clocking module 213, whose output is dependent on the state of LFSR 203. For example, if the output of clocking module 211 is a '1', LFSR 203 clocks, and if the output of clocking module 211 is a '0', LFSR 203 does not clock. LFSR 201 may be clocked according to an internal feedback clock, as shown in FIG. 2, or an external clocking if desired.

The clocking modules 211-215 may be implemented as XOR gates, for example, although other logic functions may be implemented without deviating from the intended scope of the present invention. For example, if clocking module 211 is implemented as an XOR gate and bits corresponding to the tap sequence of LFSR 201 have an odd number of '1's in a given state, clocking module 211 outputs a '1' and LFSR 203 clocks.

Following a previous example, suppose LFSR 201 is set to 11 bits and initialized to '01001101001', and the example primitive polynomial $x^{10}+x^3+1$ is used to determine the taps. Accordingly, bits corresponding to a '1' ($10^{th}$ bit), a '0' ($3^{rd}$ bit), and a '0' ($0^{th}$ bit) are fed into clocking module 211. If clocking module 211 is implemented as an XOR gate, the XOR operation yields a '1' result (odd number of '1's), and clocking module 211 outputs a '1' value signaling LFSR 203 to clock.

Thus, the pseudo-random initial state of the registers in the register pool is used as a seed to generate other pseudo-random states. The permutations of the pseudo-random states are used to produce a key stream of random bits without significant probability of repetition. With reference to FIG. 2, output module 220 uses the outputs of LFSR 201, LFSR 203, and clocking module 215 to produce a key stream.

Similar to the clocking modules 211-215 described above, the output module 220 may be implemented as an XOR gate, although other logic functions may be implemented without deviating from the scope of the present invention. As shown in FIG. 2, the key stream may also be used as an internal feedback clock to clock LFSR 201.

Because the LFSRs 201-205 are initialized by the register controller 250 with essentially random information from the extractor 120, and the LFSRs 201-205 are permuted in an essentially random manner according to tap sequences defined by primitive polynomials, generated key streams will include essentially random bits with nearly infinite periods. In contrast to conventional methods of generating secret keys, example embodiments of the present invention may generate keys without computationally intensive mathematical algorithms that significantly consume system resources. Furthermore, newly generated primitive polynomials and corresponding tap sequences produce different key streams from even identical initial states. The randomization of keys generated according to example embodiments of the present invention will therefore be robust even with significant lengths and/or repeated initial states.

The generator 140 of FIG. 1 is used to convert the key stream generated by the permuter 130 into a form suitable for transmission to an invoking system. For example, the key stream may be encapsulated into data packets or the like, and transmitted over various data channels, such as fiber optic lines, TCP/IP, etc. If the key generator 100 is implemented as part of the invoking system 10, transmission of the key may not be required, and the generator 140 may act as a relay to other internal components.

Figure 3:
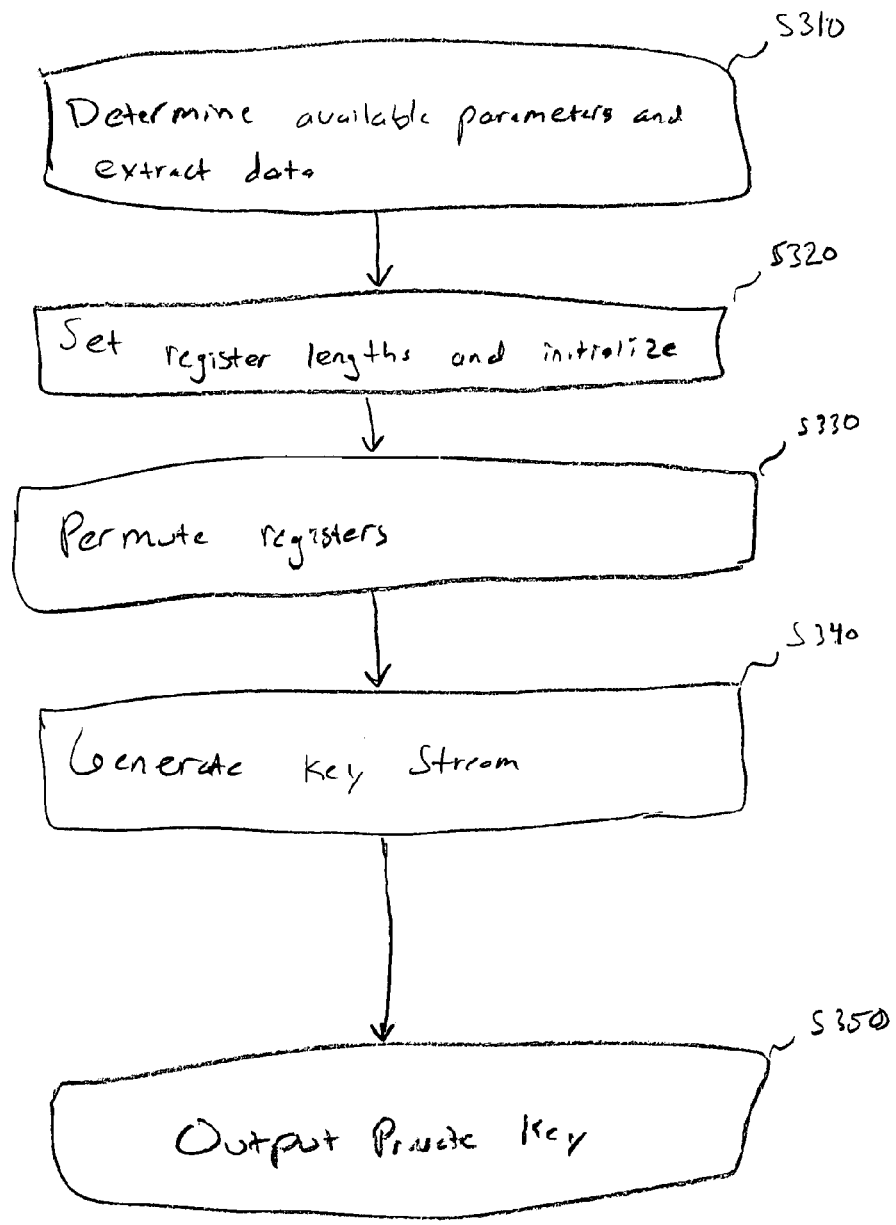
FIG. 3 illustrates a method of generating a variable length private key according to an example embodiment of the present invention.

FIG. 3 illustrates a method of generating a variable length private key according to an example embodiment of the present invention. Available parameters of an invoking system are determined and data is extracted therefrom (S310). For example, for a telecommunications server invoking system running on a Linux/Unix/Solaris platform, a first PID, a second PID, a Memory Size of the first process, a CPU usage of the first process, and a CPU Time of the second process may be analyzed and data extracted therefrom using a "prstat -s cpu 1" command, as described previously.

The extracted data is used to initialize a series of shift registers, the length of each shift register being dynamically set such that the total number of bits in the plurality of shift registers is equal to the total number of bits in a private key of the desired length (S320). The shift registers are set to prime length when possible.

The shift registers are continually permuted by pseudo-random clock signals generated from certain bits of each shift register according to a tap sequence derived from a primitive polynomial (S330). For example, a tap sequence may specify certain pseudo-random bits of one register that may be combined to generate a pseudo-random clock signal used to clock a different register. An internal feedback clock may also be used to clock one or several of the registers, or an external clock may be used when appropriate.

Outputs of the shift registers and/or pseudo-random clock signals are combined to generate a key stream of random bits (S340). Permuting the shift registers provides for a significantly low probability of repeating key streams. Moreover, new primitive polynomials for each shift register may even be generated to allow unique keys to be produced from common shift register initializations. The private key is then output in a form suitable for transmission to an appropriate receiver (S350).

Example embodiments having thus been described, it will be obvious that the same may be varied in many ways. For example, the methods according to example embodiments may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

The executable computer program(s) may include the instructions to perform the described operations or functions. The computer executable program(s) may also be provided as part of externally supplied propagated signal(s). Such variations are not to be regarded as a departure from the intended spirit and scope of example embodiments, and all such modifications as would be obvious to one skilled in the art are intended to be included within the scope of the following claims.

What is claimed is:

1. A variable length private key generator, comprising:
   a permuter configured to generate a key stream of a desired length by permuting a plurality of shift registers;
   a system analyzer configured to detect at least one dynamic system parameter of an invoking system; and
   a register controller configured to initialize the plurality of shift registers based on the at least one detected dynamic system parameter of the invoking system.

2. The variable length private key generator of claim 1, wherein each of the plurality of shift registers is a linear feedback shift register.

3. The variable length private key generator of claim 1, wherein the permuter comprises:
   the plurality of shift registers;
   a plurality of clocking modules, each corresponding to a different one of the plurality of shift registers and configured to generate a clocking signal based on selected bits of the corresponding shift register; and
   an output module configured to output the key stream based on at least one clocking signal and output of at least one of the plurality of shift registers.

4. The variable length private key generator of claim 3, wherein the selected bits received by each clocking module are tapped from the corresponding shift register according to a corresponding tap sequence based on a corresponding primitive polynomial.

5. The variable length private key generator of claim 4, wherein the degree of each primitive polynomial is equal to the length of at least one of the plurality of shift registers.

6. The variable length private key generator of claim 3, wherein at least one of the clocking modules is configured to generate a clocking signal to permute one of the plurality of shift registers based on selected bits of another of the plurality of shift registers.

7. The variable length private key generator of claim 6, wherein each clocking module is an XOR gate.

8. The variable length private key generator of claim 6, wherein at least one of the plurality of shift registers is clocked by an internal feedback clock.

9. The variable length private key generator of claim 8, wherein the internal feedback clock is based on the key stream.

10. The variable length private key generator of claim 3, wherein the output module is an XOR gate.

11. The variable length private key generator of claim 3, wherein the register controller further is configured to adjust the length of each of the plurality of shift registers.

12. The variable length private key generator of claim 11, wherein the register controller is further configured to set each of the plurality of shift registers to a prime length while keeping a total number of bits in the plurality of shift registers greater than or equal to a number of bits of the desired length of a private key.

13. The variable length private key generator of claim 1, further comprising:
   an extractor configured to extract data from the at least one dynamic system parameter detected by the system analyzer.

14. The variable length private key generator of claim 13, wherein the dynamic system parameter includes at least one of i) a number of processes running, ii) central processing unit utilization, iii) timer information, iv) random access memory utilization, v) buffer utilization, and vi) peripheral device usage.

15. The variable length private key generator of claim 1, further comprising:
   a generator configured to output a private key of the desired length from the key stream.

16. A method of generating a variable length private key, comprising:
   generating a key stream of a desired length by permuting a plurality of shift registers
   detecting at least one dynamic system parameter of an invoking system; and
   initializing the plurality of shift registers based on the at least one detected dynamic system parameter of the invoking system.

17. The method of claim 16, wherein permuting the plurality of shift registers comprises:
   generating clocking signals based on bits tapped from the plurality of shift registers according to tap sequences derived from primitive polynomials; and
   permuting at least one of the plurality of shift registers based on the clocking signals.

18. The method of claim 17, wherein the generating clocking signals step comprises:
   respectively XORing bits tapped from each of the plurality of shift registers according to a corresponding tap sequence derived from a corresponding primitive polynomial to produce a corresponding clocking signal.

19. The method of claim 17, further comprising:
   clocking at least one of the plurality of shift registers by an internal feedback clock.

20. The method of claim 19, wherein the internal feedback clock is the generated key stream.

21. The method of claim 17, further comprising:
   generating the key stream from at least one clocking signal and output from at least one of the plurality of shift register.

22. The method of claim 21, wherein the generating the key stream step includes XORing the at least one clocking signal and the output of the at least one shift register.

23. The method of claim 16, further comprising:
   setting the length of each of the plurality of shift registers based on the desired length of a private key.

24. The method of claim 23, wherein the setting step sets the length of each shift register to a prime length such that a total number of bits in the plurality of shift registers is greater than or equal to a number of bits of the desired length of the private key.

25. The method of claim 16, further comprising:
   outputting a private key of the desired length from the key stream.

* * * * *